(12) United States Patent
Trageser

(10) Patent No.: US 9,620,017 B2
(45) Date of Patent: Apr. 11, 2017

(54) VEHICLE MERGE ASSISTANCE SYSTEM AND METHOD

(75) Inventor: Vern Trageser, Charleston, SC (US)

(73) Assignee: Robert Bosch GmbH, Stuttgart (DE)

( * ) Notice: Subject to any disclaimer, the term of this patent is extended or adjusted under 35 U.S.C. 154(b) by 1151 days.

(21) Appl. No.: 13/325,748

(22) Filed: Dec. 14, 2011

(65) Prior Publication Data

US 2013/0158800 A1 Jun. 20, 2013

(51) Int. Cl.
| | | |
|---|---|---|
| *B62D 6/00* | (2006.01) |
| *G08G 1/16* | (2006.01) |
| *B60K 31/00* | (2006.01) |
| *B60W 10/06* | (2006.01) |
| *B60W 10/184* | (2012.01) |

(52) U.S. Cl.
CPC ......... *G08G 1/167* (2013.01); *B60K 31/0008* (2013.01); *B60W 10/06* (2013.01); *B60W 10/184* (2013.01); *B60K 2031/0033* (2013.01); *B60W 2420/403* (2013.01); *B60W 2420/52* (2013.01); *B60W 2520/10* (2013.01); *B60W 2520/105* (2013.01); *B60W 2550/14* (2013.01); *B60W 2550/302* (2013.01); *B60W 2550/402* (2013.01)

(58) Field of Classification Search
CPC ........... B60W 30/18163; B60W 30/10; B60W 30/12; B60W 30/14; B62D 15/0255; B60K 31/00; G08G 1/167
USPC ..................................... 701/41, 70, 96, 301
See application file for complete search history.

(56) References Cited

U.S. PATENT DOCUMENTS

2007/0032943 A1 2/2007 Okabe

FOREIGN PATENT DOCUMENTS

| EP | 1332910 | 8/2003 |
| JP | 2008222153 | 9/2008 |

OTHER PUBLICATIONS

International Search Report and Written Opinion for Application No. PCT/US2012/068677 dated Mar. 14, 2013 (12 pages).

*Primary Examiner* — John Q Nguyen
*Assistant Examiner* — Anshul Sood
(74) *Attorney, Agent, or Firm* — Michael Best & Friedrich LLP

(57) ABSTRACT

A merge assistance system for a vehicle. The system includes a camera configured to monitor an area, at least one sensor configured to detect information about at least one moving target object, an electronic control unit having a processor in electronic communication with the camera and the sensor to receive information about the monitored area and the at least one moving target object. The system also includes a computer readable medium storing instructions that cause the processor to receive information about a velocity and an acceleration of the vehicle, determine a merging location based on the information received from the camera, determine a velocity and an acceleration of the at least one moving target object based on the information from the at least one sensor, identify a merge assist situation, and initiate a merge driving maneuver to control the vehicle during the merge assist situation.

20 Claims, 4 Drawing Sheets

VEHICLE MERGE ASSISTANCE SYSTEM AND METHOD

BACKGROUND

The present invention relates to driver assistance systems. More specifically, the invention relates to merge assistance systems. These systems detect when a vehicle enters a merging location and adjust the vehicle's speed by controlling the engine or the vehicle braking system to assist the driver to merge with another vehicle entering in the lane and to avoid a collision.

SUMMARY

Very often, vehicle accidents occur when a vehicle enters the highway or a busy street from a merging lane and collides with the vehicle travelling in that lane. Many new vehicles include collision avoidance technologies that are based-upon or incorporate RADAR (radio detecting and ranging), LIDAR (light detection and ranging), ultra-sonic sensors, or video systems. These collision avoidance systems are sometimes referred to as "adaptive cruise control" ("ACC") or "forward collision warning and mitigation" ("FCWM"). Although the technologies are improvements over past systems, they are still not capable of assisting during merging and preventing accidents between vehicles.

In one embodiment, the invention provides a merge assistance system for a vehicle. The merge assistance system includes a camera configured to be coupled to the vehicle and to monitor an area, at least one sensor configured to be coupled to the vehicle and to detect information about at least one moving target object, and an electronic control unit having a processor. The electronic control unit is in electronic communication with the camera and the sensor to receive information about the monitored area and the at least one moving target object. The merge assistance system also includes a computer readable medium storing instructions. When executed by the processor, the instructions cause the processor to receive information about a velocity and an acceleration of the vehicle, determine a merging location based on the information received from the camera, and determine a velocity and an acceleration of the at least one moving target object based on the information from the at least one sensor. The processor also identifies a merge assist situation, and initiates a merge driving maneuver to control the vehicle during the merge assist situation.

In another embodiment, the invention provides a computer-implemented method for merge assistance of a vehicle. The method includes monitoring an area by a camera coupled to the vehicle, detecting, by at least one sensor coupled to the vehicle, information about at least one moving target object, and connecting an electronic control unit having a processor with the camera and the sensor. The processor receives, at the electronic control unit, information from the camera and the sensor. The method further includes operating the processor of the electronic control unit to receive information about a velocity and an acceleration of the vehicle, determine a merging location based on the information received from the camera, determine a velocity and an acceleration of the at the least one moving target object based on the information from the at least one sensor, identify a merge assist situation, and initiate a merge driving maneuver to control the vehicle during the merge assist situation.

In yet another embodiment, the invention provides a merge assistance system for a vehicle. The merge assistance system includes an electronic device configured to provide information about a plurality of road conditions, at least one sensor configured to be coupled to the vehicle and to detect information about at least one moving target object; an electronic control unit having a processor, the electronic control unit in electronic communication with the electronic device and the sensor to receive the information about the plurality of road conditions and the at least one moving target object. The merge assistance system also includes a computer readable medium storing instructions that, when executed by the processor, cause the processor to receive information about a velocity and an acceleration of the vehicle, determine a merging location based on information received from the electronic device, determine a velocity and an acceleration of the at the least one moving target object based on the information from the at least one sensor, identify a merge assist situation, and initiate a merge driving maneuver to control the vehicle during the merge assist situation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention.

Figure 1:
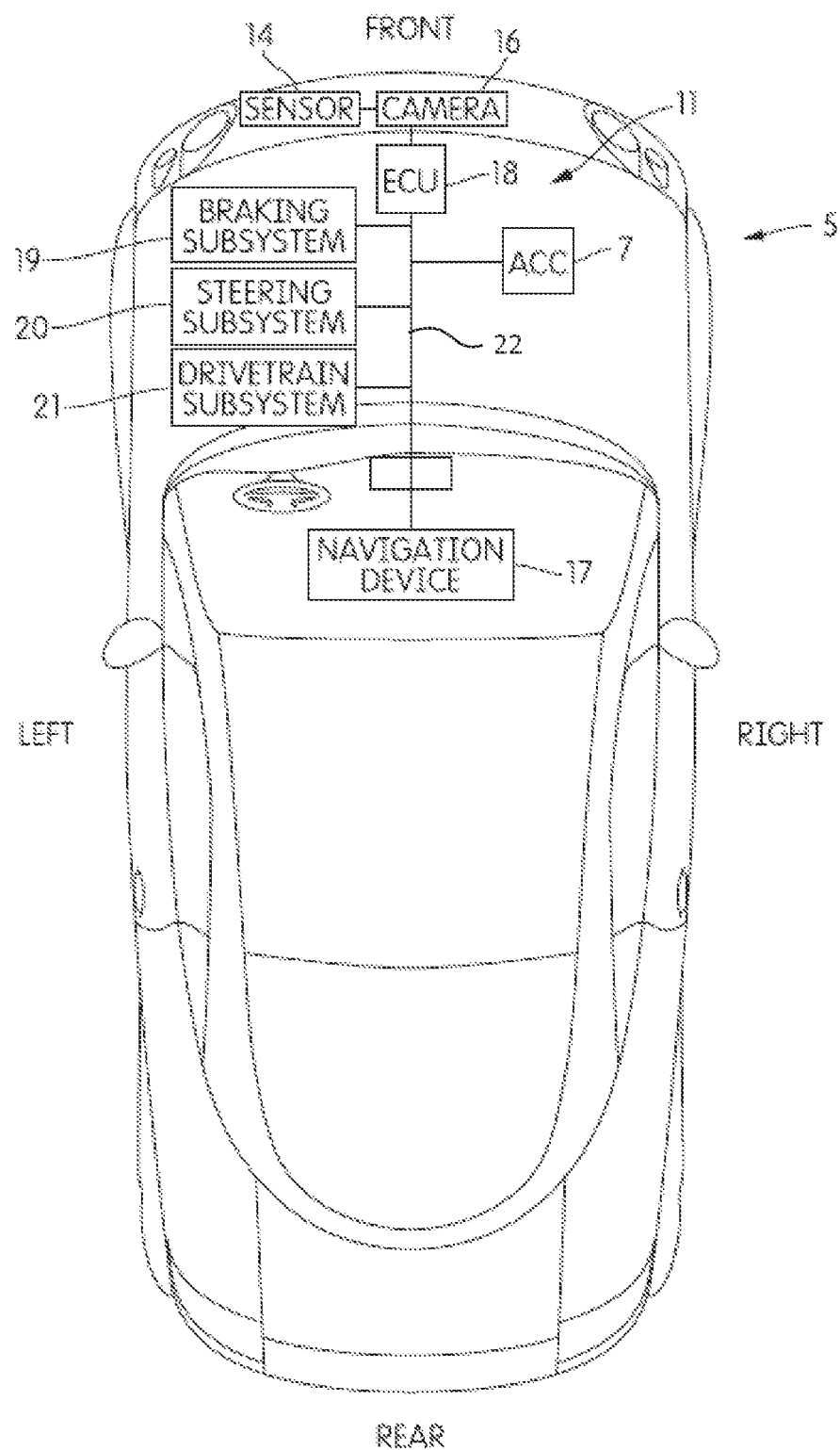
FIG. 1 is a top view of a vehicle including a merge assistance system.

FIG. 1 illustrates a host vehicle 5. The host vehicle 5 includes, among other systems, an adaptive cruise control ("ACC") system 7 and a merge assistance system 11 used to assist the vehicle 5 during merging. The ACC system 7 is similar to a traditional cruise control, but uses additional sensing equipment to detect other objects, e.g., a target vehicle in front of and in the same lane as the user's vehicle. For example, a user sets a vehicle speed to 50 miles per hour ("mph") and, while proceeding at 50 mph under control of the ACC, the vehicle approaches a slower-moving, target vehicle in the same driving lane, the ACC causes the vehicle to slow down. The ACC uses throttle and brake controls to first reduce the speed of the host vehicle. Then, the ACC controls the speed of the host vehicle to maintain a particular distance between the host vehicle and the target vehicle. The particular distance is based on user selection, sensed weather conditions, sensed road conditions, and other factors. The ACC controls the speed of the host vehicle to be at the lesser of 1) the speed necessary to maintain the particular distance and 2) the user-set speed. If the host vehicle changes lanes, or the target vehicle changes lanes or otherwise is no longer detected by the ACC, and no new target vehicle within the particular distance is detected, the ACC causes the vehicle to accelerate and then maintain the user-set speed.

In one embodiment of the invention, the merge assistance system 11 is incorporated within the ACC system 7. For example and as further explained below, the merge assistance system 11 is implemented in the form of software embedded within the existing ACC system 7. In another embodiment, the merge assistance system 11 is not part of the ACC system 7 and operates independently from the ACC system 7.

The merge assistance system 11 includes at least one sensor 14, an imaging device or camera 16, an electronic device (e.g., a navigation device or a GPS 17 that is internal or external to the vehicle 5), an electronic control unit ("ECU") 18, and a plurality of subsystems 19-21. The subsystems can include a braking subsystem 19, a steering subsystem 20, and a drivetrain subsystem 21. Additional subsystems include a traction control subsystem, a stability subsystem, and the like (not shown). The merge assistance system 11 determines when the vehicle 5 is approaching a merging location (e.g., entrance ramp, intersection, etc.), identifies a merge assist situation (e.g., when an incoming vehicle enters the merging ramp and merges in the lane of the host vehicle 5), and initiates a merge driving maneuver to control the vehicle 5 during the merge assist situation.

The sensor 14 may include, for example, long-range RADAR sensor, scanning sensor (such as a 360-degree LIDAR sensor), ultrasonic, infrared light, and proximity (e.g., capacitive) sensors or other types of forward-looking technology configured to observe the area ahead and around the vehicle 5. The sensor 14 is mounted on the front portion of the vehicle 5. For example, the sensor 14 is positioned in the center of the front bumper of the vehicle 5. When the sensor 14 is a 360-degree LIDAR sensor, the sensor can be positioned at a top or a bottom portion of the vehicle 5 to monitor a 360-degree area around the vehicle 5.

The sensor 14 senses activity and target objects in areas or regions outside the perimeter of the vehicle 5. There are two broad categories of sensed objects: stationary objects (e.g., stop lights, traffic signs, railroad tracks, pavement, walls, parked vehicles, utility poles, etc.) and moving objects (e.g., moving vehicles, pedestrians, etc.). In FIG. 1, the sensor 14 is located in the front portion of the vehicle 5 (e.g., front bumper), but, in other embodiments, the system 11 includes more sensors 14 located on the sides (e.g., doors) or the rear portion (e.g., rear bumper) of the vehicle 5. As explained below, the sensor 14 detects information about vehicles merging into the lane of the host vehicle 5 and assists the merge assistance system 11 during the merge situation.

The camera 16 of the merge assistance system 11 is configured to capture images of the area and objects ahead and around the vehicle. The camera is usually mounted behind the windshield or in the front bumper of the vehicle 5. However, the position of the camera 16 of can vary depending on the particular vehicle in which it is installed and the type of camera used. The camera 16 can be configured in a number of ways. For example, in one configuration the camera 16 includes a monocular camera module. In another configuration, the camera includes a binocular camera module. In addition, the camera can be designed or built based on one or more detection technologies such as a complimentary metal-oxide semiconductor ("CMOS") or charge-coupled device ("CCD") technologies. The camera can capture monochrome (black and white) or color images.

The camera 16 monitors the traveling path of the vehicle 5 and various objects in the surrounding environment, and continuously captures images in the visible and/or near infrared spectrum. The camera 16 provides images (or image data) of a plurality of road conditions to the ECU 18. For example, the camera 16 captures images of lane markings, traffic signs, and traffic signals ahead of the vehicle 5. The ECU 18 processes the images to determine whether the vehicle 5 is approaching a merging location (e.g., a shoulder of the highway where other vehicles enter the highway). The merge assistance system 11 can also include more than one camera 16.

The navigation device 17 is located on the dashboard of the vehicle and can include a display device (e.g., an LCD monitor). The navigation device 17 can be a GPS device that provides information to the ECU 18 about the location of the vehicle. In other embodiments, the information obtained from the navigation device 17 is combined with stored map information to provide information about road conditions (e.g., location of merging lanes, traffic lights, etc.) ahead of the vehicle 5. The ECU 18 can use that information instead of or in combination with the information provided from the camera 16 to determine when the vehicle 5 is approaching a merging location. The sensor 14, the navigation device 17, the camera 16, and the ECU 18 are connected to a bus or network, such as a controller area network ("CAN") bus 22. The CAN bus 22 is connected to other vehicle systems (e.g., subsystems 19-21). Although the components are shown connected via a bus or network, other connections (such as direct wired or wireless connections) can be used to connect the sensor 14, the camera 16, and the navigation device 17 to the ECU 18. The ECU 18 includes a data processing module configured to process the information obtained from the sensor 14, the camera 16, and/or the navigation device 17 while the vehicle 5 travels.

Figure 2:
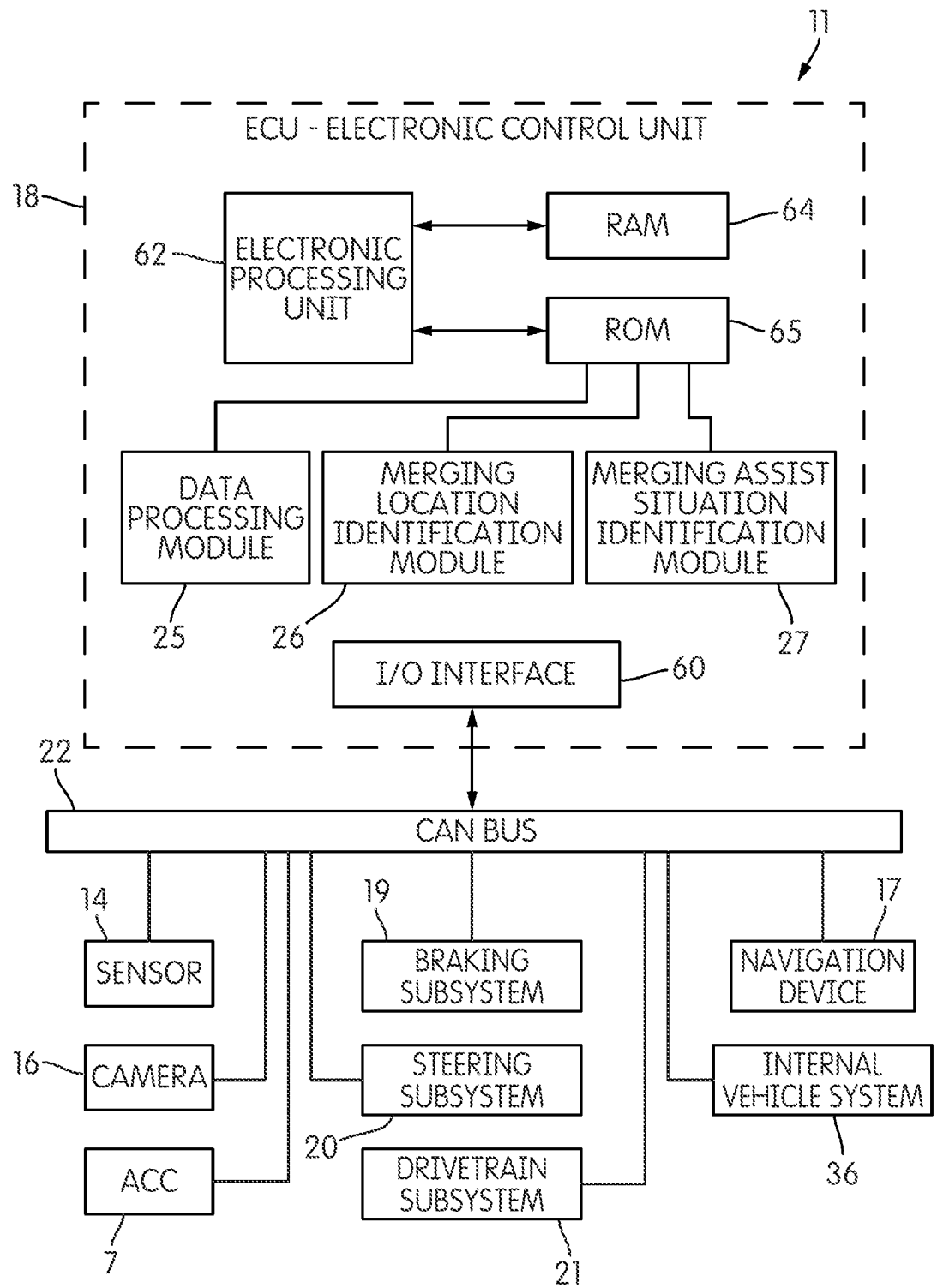
FIG. 2 is a schematic illustration of the merge assistance system of FIG. 1.

FIG. 2 schematically illustrates the merge assistance system 11 in more detail. As shown in FIG. 2, the system 11 includes the ECU 18, the sensor 14, the navigation device 17, the camera 16, and the bus 22. As further discussed below, the ECU 18 can also communicate with other devices or systems through the bus 22. However, the ECU 18 can also obtain information (i.e., data) directly from the sensor 14 and the camera 16 rather than over the bus 22. As illustrated in FIG. 2, the ECU 18 of the system 11 is also connected to the ACC system 7, the braking subsystem 19, the steering subsystem 20, and the drivetrain subsystem 21.

As shown in FIG. 2, the ECU 18 includes an input/output interface 60, an electronic processing unit ("EPU") or a processor 62, and one or more non-transitory memory modules, such as a random access memory ("RAM") 64 and read-only memory ("ROM") 65. The input/output interface 60 transmits and receives data over the bus 22, including data from the sensor 14, the camera 16, and/or the navigation device 17. It should be understood that the ECU 18 can include multiple processors, additional computer-readable medium modules, multiple I/O interfaces, and/or other additional components or modules (e.g., hardware, software, or a combination thereof).

The input/output interface 60 allows the ECU 18 to communicate with other components inside the vehicle 5 (e.g., over the CAN 22) and outside of the vehicle 5. In other words, the input/output interface 60 receives data from outside the ECU 18 and outputs information outside the ECU 18. For example, the input/output interface 60 can include a network interface, such as a vehicle-to-vehicle communication device or a wireless network card that allows the system 11 to send and receive information over a network, such as a local area network or the Internet. In some embodiments, the input/output interface 60 is located external to the ECU 18 and may receive data from other devices or systems located in the vehicle 5. Similarly, the ECU 18 may be included within another vehicle control system rather than configured as a separate component (e.g., within the ACC system 7). In addition, although not shown in FIG. 2, conditioning circuits or peripheral drivers may be used to interface the ECU 18 with the sensor 14.

In one embodiment, the ECU 18 is configured to communicate with the navigation device 17, the ACC system 7, the braking subsystem 19, the steering subsystem 20, and the drivetrain subsystem 21. The ECU 18 is configured to receive information from these systems. For example, the ECU 18 receives information about various road objects and conditions on the road (e.g., entrance ramp, stop light, railway crossing, etc.). Further, the ECU 18 receives information about the state of the vehicle 5 (e.g., speed, velocity, acceleration/deceleration, yaw rate, and steering angle, etc.) from the subsystems 19-21. The ECU 18 can also obtain this information by communicating with an electronic stability control system or another internal vehicle system 36 (e.g., ESP® designed by Robert Bosch).

The EPU 62 receives the information from the input/output interface 60 and processes the information by executing one or more instructions or modules (e.g., the data processing module 25, merging location identification module 26, merge assist situation identification module 27, etc.). The instructions or modules are stored in non-transitory computer-readable medium, such as ROM 65. The EPU 62 stores and retrieves information (e.g., information received from the bus 22 or information generated by instructions or modules executed by the EPU 62) to and from the RAM 64. The non-transitory computer readable medium 65 includes volatile memory, non-volatile memory, or a combination thereof. The computer-readable medium 65 stores operating system software, applications and/or instructions, data, or combinations thereof. It should be understood that although only a single EPU, RAM, ROM, and input/output interface are illustrated in FIG. 2, the ECU 18 can include multiple processing units, memory modules, and/or input/output interfaces.

Although the ECU 18 is illustrated in FIGS. 1-2 as a separate component from the sensor 14, in some embodiments the ECU 18 is included in the sensor 14 or the camera 16. In other embodiments, the ECU 18 is separate from the sensor 14 or the camera 16 to prevent faults (e.g., electrical, mechanical, or software-based) in the sensor 14 and the camera 16 from affecting the functionality provided by the ECU 18. The ECU 18 can also be combined with other vehicle controllers.

The instructions stored in the computer-readable medium provide particular functionality when executed by the EPU 62. The ECU 18 includes hardware and software and these components cooperate to execute the logic of the merge assistance system 11. As shown in FIG. 2, the input/output interface 60 of the ECU 18 receives data from the sensor 14, the camera 16 or the other systems over the can 22 and provides the data to the processor 62 of the ECU 18. In some embodiments, the input/output interface 60 processes the data from the sensor 14 and the camera 16 before providing the images to the processor 62 of the ECU 18. As described in more detail below with respect to FIGS. 3 and 4, the processor 62 processes the received data, determines various parameters related to a second moving vehicle positioned on the side and/or ahead of the host vehicle 5 (e.g., velocity, acceleration of the second vehicle), determines a merging location, identifies a merge assist situation, and initiates a merge driving maneuver to control the vehicle during the merge assist situation. During the merge driving maneuver, the processor 62 generates control signals to at least one of the subsystems 19-21 to, for example, slow the vehicle 5, change its direction, or cause it to accelerate.

The system 11 determines when the vehicle 5 approaches a merging location based on the data received from the camera 16, and/or the navigation device 17. The merging location is identified as an entrance ramp or an intersection where there is a possibility that another vehicle will merge into the lane of the host vehicle 5. A merge assist situation is identified as a situation where the system 11 has identified a merging location and has detected (by using the sensor 14) that a second vehicle approaches the merging location in order to merge into the lane of the host vehicle 5. The goal of the merge assistance system 11 is to control the velocity and the acceleration vehicle 5 in order to assist with a safe merge of the incoming second vehicle into the lane of the vehicle 5.

When the merge assistance system 11 is integrated within the ACC system 7 or configured to communicate with that system, the ACC system 7 controls the merge assistance system 11 and begins a merge driving maneuver without the driver's input when the vehicle 5 is moving with a predetermined speed set by the ACC system 7 and the merge assistance system 11 detects a merge assist situation. The merge assistance system 11 can be controlled independently from the ACC system 7. For example, the driver of the vehicle 5 is able to independently control the system 11 by operating an interactive interface (e.g., a menu option control) displayed on the viewing screen (not shown) of the navigation device 17 or another human machine interface. The screen is positioned on the dashboard of the vehicle 5 and provides information to the driver in various formats. The menu option control allows the driver to communicate with the ECU 18 of the system 11 and/or with other systems of the vehicle 5. Thus, by selecting the appropriate menu option, the driver can activate/deactivate the merge assistance system 11 without interference with the ACC system 7. In addition to the viewing screen, the navigation device 17 can include a speaker (not shown) for providing audible information to the vehicle operator and/or one or more warning lights or light emitting diodes ("LEDs," not shown) for providing visual information to the vehicle operator.

Figure 3:
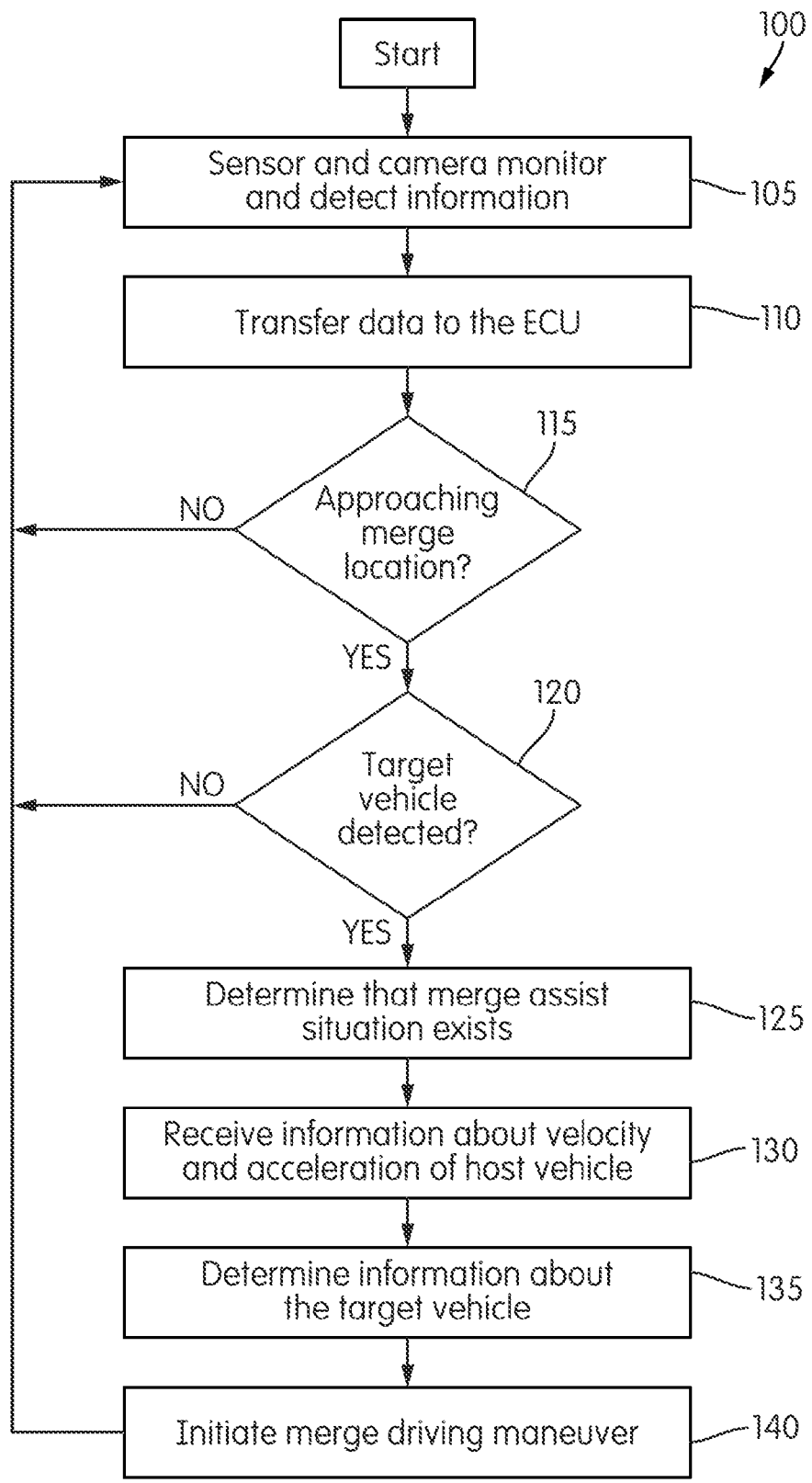
FIG. 3 is a flow chart illustrating a process for merge assistance of a vehicle performed by the merge assistance system of FIG. 1.

FIG. 3 illustrates a method 100 of merge assistance for the host vehicle 5 performed by the ECU 18 according to one embodiment of the invention. For simplicity, one iteration of the logic of FIG. 3 is explained in detail below. In this embodiment, the merge assistance system 11 is operating independently from the ACC system 7. While the vehicle 5 is traveling on the road, the camera 16 monitors an area ahead and/or around the vehicle 5, and the sensor 14 detects information about moving vehicles that travel next to the vehicle 5 (at step 105). The camera 16 and the sensor 14 transfer the acquired data to the ECU 18 (at step 110). As explained above, the ECU 18 can also receive data (e.g., information about a plurality of road conditions) from the navigation device 17. The data processing module 25 processes the received data and the merging location identification module 26 determines whether the vehicle approaches a merging location (at step 115). If the vehicle 5 approaches a merging location, the processor determines whether there is a target vehicle that is about to merge into that location (at step 120). That target vehicle can merge from either the left or the right side of the host vehicle 5. If there is another vehicle that is also approaching the merging location, the merge assist situation identification module 27 determines that a merge assist situation exists (at step 125).

In the next step, the processor 62 receives information about the acceleration and velocity of the vehicle 5 from the subsystems 19-21 (at step 130). The processor uses the information from the sensor 14 to determine the velocity and the acceleration of the approaching vehicle (at step 135). In some embodiments, at this step, the processor also determines the distance between the vehicle 5 and the moving target vehicle, a first time frame in which the vehicle 5 will reach the merging location, and a second time frame in which the moving target vehicle will reach the merging location. Using some of all of this information, the processor 62 initiates a merge driving maneuver to control the vehicle 5 during the merge assist situation (at step 140). During the merge driving maneuver, the processor 62 generates control signals to at least one of the braking subsystem 19, the steering subsystem 20, and the drivetrain subsystem 21. These or other subsystems control the vehicle 5 (e.g., slow the vehicle by applying the brakes, change its direction by steering, or cause it to accelerate) in order to assist the vehicle 5 during the merge with the incoming vehicle.

Figure 4:
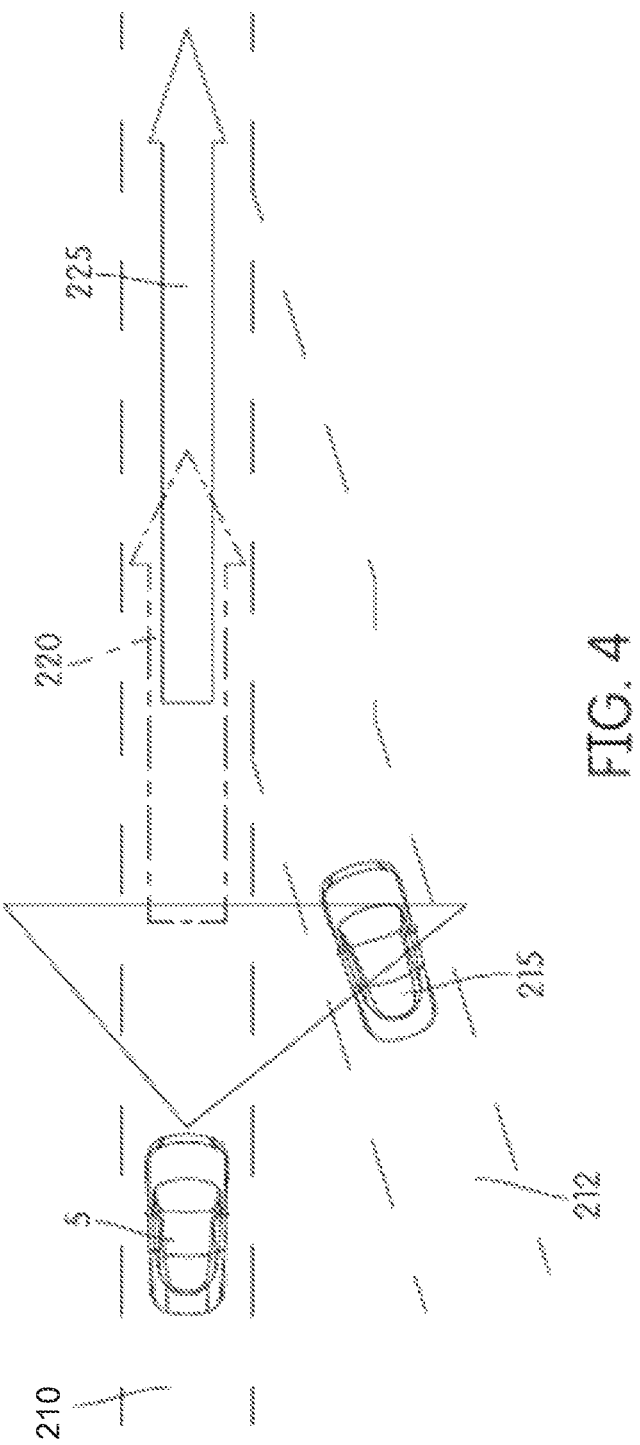
FIG. 4 illustrates a merge assistance system and a method according to an embodiment of the invention.

FIG. 4 illustrates an alternative method 200 of merge assistance for the vehicle 5 performed by the ECU 18 according to another embodiment of the invention. In this embodiment, the merge assistance system 11 is operating together with the ACC system 7. FIG. 4 illustrates a road 210, a merging lane 212, the host vehicle 5, a second vehicle 215, a merging location 220, and a merge driving maneuver 225. The host vehicle 5, as described above, includes at least one sensor 14, the ACC system 7, and the video camera 16 (or the navigation device 17). In one example, the ACC system 7 of the vehicle 5 is active (i.e., is on) and the vehicle 5 is traveling at a set speed (e.g., 50 mph). The driver has also activated the merge assistance system 11 by using the menu option control as described above. The camera 16 monitors the area ahead and around the vehicle 5, and the sensor 14 detects information about the second vehicles 215. The camera 16 and the sensor 14 transfer the acquired data to the ECU 18. The data processing module 25 processes the received data and the merging location identification module 26 determines when the vehicle 5 approaches the merging location 220. Because the second vehicle 225 is traveling on the merging lane 212 and is also approaching the merging location, the merge assist situation identification module 27 determines that a merge assist situation exists.

At that point, the processor 62 receives information about the acceleration and velocity of the vehicle 5 and determines the velocity and the acceleration of the approaching second vehicle 215. Using this information, the processor 62 initiates a merge driving maneuver 225 to control the vehicle 5 during the merge assist situation. Specifically, based on the position, the velocity, and the acceleration of the both vehicles 5 and 215, the processor 62 generates control signals to the drivetrain subsystem 21. The drivetrain sub-system 21 implements the merge driving maneuver 225 by accelerating the vehicle 5. Therefore, the vehicle 5 continuous to travel in the same lane, but when the second vehicle 215 reaches the merging location 220 and merges into the road 200, the host vehicle 5 is ahead of second vehicle 215.

What is claimed is:

1. A merge assistance system for a vehicle, the merge assistance system comprising:
   a camera configured to be coupled to the vehicle and to monitor an area;
   at least one sensor configured to be coupled to the vehicle and to detect information about at least one moving target object;
   an electronic control unit having a processor, the electronic control unit in electronic communication with the camera and the sensor to receive information about the monitored area and the at least one moving target object; and
   a computer readable medium storing instructions that, when executed by the processor, cause the processor to:
     receive information about a velocity and an acceleration of the vehicle,
     determine a merging location based on the information received from the camera,
     determine a velocity and an acceleration of the at the least one moving target object based on the information from the at least one sensor,
     identify a merge assist situation, and
     initiate a merge driving maneuver including a change in direction to control the vehicle during the merge assist situation.

2. The system of claim 1, wherein the sensor includes long-range RADAR sensor positioned at a front end of the vehicle.

3. The system of claim 1, wherein the computer readable medium further stores instructions that, when executed by the processor, cause the processor to determine a distance between the vehicle and the moving target object, and wherein the merge assist situation is determined at least in part by using the distance between the vehicle and the target object.

4. The system of claim 1, wherein the computer readable medium further stores instructions that, when executed by the processor, cause the processor to determine a first time frame in which the vehicle will reach the merging location, and wherein the merge assist situation is determined at least in part by using the first time frame.

5. The system of claim 1, wherein the computer readable medium further stores instructions that, when executed by the processor, cause the processor to determine a second time frame in which the moving target object will reach the merging location, and wherein the merge assist situation is determined at least in part by using the second time frame.

6. The system of claim 1, wherein the camera is configured to provide information about a plurality of road objects, and wherein the processor is configured to determine the merging location at least in part by using the plurality of road objects.

7. The system of claim 6, wherein the plurality of road objects include at least one of lane markings, traffic signs, and traffic signals.

8. The system of claim 1, wherein the electronic control unit is configured to communicate with at least one of a navigation system and an adaptive cruise control system, and wherein the adaptive cruise control system is configured to initiate the merge driving maneuver to control the vehicle during the merge assist situation.

9. The system of claim 1, wherein the electronic control unit is configured to communicate with at least one of a braking system, a steering system, or a drivetrain system during the merge driving maneuver.

10. The system of claim 9, wherein the merge driving maneuver is a braking maneuver.

11. The system of claim 9, wherein the merge driving maneuver is a steering maneuver.

12. The system of claim 9, wherein the merge driving maneuver is an acceleration maneuver.

13. The system of claim 1, wherein the camera is positioned at a front end of the vehicle.

14. A computer-implemented method for merge assistance of a vehicle, the method comprising:
    monitoring an area by a camera coupled to the vehicle;
    detecting, by at least one sensor coupled to the vehicle, information about at least one moving target object;
    connecting an electronic control unit having a processor with the camera and the sensor;
    receiving, at the electronic control unit, information from the camera and the sensor;
    operating the processor of the electronic control unit to
        receive information about a velocity and an acceleration of the vehicle,
        determine a merging location based on the information received from the camera,
        determine a velocity and an acceleration of the at the least one moving target object based on the information from the at least one sensor,
        identify a merge assist situation, and
        initiate a merge driving maneuver including a change in direction to control the vehicle during the merge assist situation.

15. The method of claim 14, further comprising determining, by the processor, a distance between the vehicle and the moving target object, and wherein the merge assist situation is determined at least in part by using the distance between the vehicle and the target object.

16. The method of claim 14, further comprising determining, by the processor, a first time frame in which the vehicle will reach the merging location, and wherein the merge assist situation is determined at least in part by using the first time frame.

17. The method of claim 14, further comprising determining, by the processor, a second time frame in which the moving target object will reach the merging location, and wherein the merge assist situation is determined at least in part by using the second time frame.

18. The method of claim 14, further comprising communicating, by the processor, with at least one of a braking system, a steering system, or a drivetrain system during the merge driving maneuver.

19. A merge assistance system for a vehicle, the merge assistance system comprising:
    an electronic device configured to provide information about a plurality of road conditions;
    at least one sensor configured to be coupled to the vehicle and to detect information about at least one moving target object;
    an electronic control unit having a processor, the electronic control unit in electronic communication with the electronic device and the sensor to receive the information about the plurality of road conditions and the at least one moving target object; and
    a computer readable medium storing instructions that, when executed by the processor, cause the processor to:
        receive information about a velocity and an acceleration of the vehicle,
        determine a merging location based on information received from the electronic device,
        determine a velocity and an acceleration of the at the least one moving target object based on the information from the at least one sensor,
        identify a merge assist situation, and
        initiate a merge driving maneuver including a change in direction to control the vehicle during the merge assist situation.

20. The system of claim 19, wherein the electronic device is a navigation system.

* * * * *